(12) United States Patent
Rodrigues

(10) Patent No.: US 10,607,180 B2
(45) Date of Patent: Mar. 31, 2020

(54) INVENTORY CONTROL FOR NON-REPAIRABLE ITEMS BASED ON PROGNOSTICS AND HEALTH MONITORING DATA

(71) Applicant: Embraer S.A., Sao Jose dos Campos-SP (BR)

(72) Inventor: Leonardo Ramos Rodrigues, Sao Jose dos Campos (BR)

(73) Assignee: Embraer S.A., Sao Jose dos Campos-SP (BR)

(\*) Notice: Subject to any disclaimer, the term of this patent is extended or adjusted under 35 U.S.C. 154(b) by 231 days.

(21) Appl. No.: 14/202,350

(22) Filed: Mar. 10, 2014

(65) Prior Publication Data
US 2015/0254601 A1 Sep. 10, 2015

(51) Int. Cl.
*G06Q 10/08* (2012.01)
(52) U.S. Cl.
CPC ................... *G06Q 10/087* (2013.01)
(58) Field of Classification Search
None
See application file for complete search history.

(56) References Cited

U.S. PATENT DOCUMENTS

| | | | |
|---|---|---|---|
| 4,414,539 A | 11/1983 | Armer | |
| 4,888,076 A | 12/1989 | Martin | |
| 5,216,612 A \* | 6/1993 | Cornett | G05B 19/4184 |
| | | | 700/96 |
| 5,467,268 A | 11/1995 | Sisley et al. | |
| 5,890,134 A | 3/1999 | Fox | |
| 5,913,201 A | 6/1999 | Kocur | |
| 6,370,839 B1 | 4/2002 | Nakagawa et al. | |
| 6,442,459 B1 | 8/2002 | Sinex | |
| 6,636,813 B1 | 10/2003 | Isobe et al. | |
| 6,657,429 B1 | 12/2003 | Goldfine et al. | |
| 7,447,598 B2 | 11/2008 | Malkin et al. | |
| 7,502,747 B1 | 3/2009 | Pardo et al. | |
| 7,558,639 B2 | 7/2009 | Rassaian et al. | |
| 2003/0088373 A1 | 5/2003 | Fields et al. | |
| 2003/0111525 A1 | 6/2003 | Sweeney et al. | |
| 2004/0162811 A1 | 8/2004 | Wetzer et al. | |
| 2004/0176887 A1 \* | 9/2004 | Kent | G05B 23/0221 |
| | | | 701/29.5 |
| 2006/0074609 A1 | 4/2006 | Freeman et al. | |

(Continued)

FOREIGN PATENT DOCUMENTS

WO WO 0046733 A1 \* 8/2000 ............ G06Q 10/087

OTHER PUBLICATIONS

NPL_Degradation_Index, downloaded from http://ieeexplore.ieee.org/stamp/stamp.jsp?tp=&arnumber=6187377 on Feb. 7, 2018, 8 pages (Year: 2012).\*

(Continued)

*Primary Examiner* — Paul Danneman
(74) *Attorney, Agent, or Firm* — Nixon & Vanderhye, P.C.

(57) ABSTRACT

In an improved inventory control policy and associated data processing system, effective inventory level is compared with a variable reorder point, R(t). When the effective stock is lower than the reorder point R, a new order of Q units is placed. Also, the lot size is optimized for each order. Parameters R and Q are continuously updated based on Remaining Useful Life (RUL) estimations obtained from a Prognostics and Health Monitoring (PHM) system.

13 Claims, 4 Drawing Sheets

(56) References Cited

U.S. PATENT DOCUMENTS

| | | |
|---|---|---|
| 2007/0010923 A1 | 1/2007 | Rouyre |
| 2007/0056375 A1 | 3/2007 | Akdeniz et al. |
| 2007/0112489 A1* | 5/2007 | Avery .................. G07C 5/008 701/29.3 |
| 2008/0172268 A1 | 7/2008 | Wingenter |
| 2009/0063237 A1 | 3/2009 | Harvey et al. |
| 2009/0070048 A1 | 3/2009 | Stothers et al. |
| 2009/0133026 A1 | 5/2009 | Aggarwal et al. |
| 2009/0133381 A1 | 5/2009 | Holmes et al. |
| 2009/0240468 A1 | 9/2009 | Torng |
| 2009/0259411 A1 | 10/2009 | Loomis et al. |
| 2010/0010856 A1 | 1/2010 | Chua et al. |
| 2010/0042283 A1 | 2/2010 | Kell et al. |
| 2010/0042338 A1 | 2/2010 | Giurgiutiu et al. |
| 2010/0186519 A1 | 7/2010 | Cerreta et al. |
| 2012/0004944 A1* | 1/2012 | Bachman ......... G06Q 10/06315 705/7.25 |
| 2014/0121885 A1 | 5/2014 | Schoonveld |

OTHER PUBLICATIONS

NPL_Degradation_Index, downloaded from http://ieeexplore.ieee.org/stamp/stamp.jsp?tp=&arnumber=6187377 on Feb. 7, 2018, 8 pages (Year: 2012) (Year: 2012).*

Kennedy, W. J., et al., "An overview of recent literature on spare parts inventories," Int. J. Production Economics, vol. 76, 2002, pp. 201-215.

Sun, Lei, et al., "Multi-echelon inventory optimal model of civil aircraft spare parts," Chinese Control and Decision Conference, 2010, pp. 824-828.

Vachtsevanos, George, et al., "Intelligent Fault Diagnosis and Prognosis for Engineering Systems," First Edition, 2006, John Wiley & Sons, Inc., New Jersey.

Dekker, Rommert, "Applications of maintenance optimization models: a review and analysis," Reliability Engineering and System Safety, 1996, vol. 51, pp. 229-240.

Fritzsche, Roy, et al., "An Integrated Logistics Model of Spare Parts Maintenance Planning within the Aviation Industry," International Science Index, 2012, vol. 6, No. 8, pp. 1-10.

Lee, Loo Hay, et al., "Multi-objective simulation-based evolutionary algorithm for an aircraft spare parts allocation problem," European Journal of Operational Research, 2008, vol. 189, pp. 476-491.

Perlman, Yael, et al., "Modeling Multi-Echelon Multi-Supplier Repairable Inventory Systems with Backorders," J. Service Science & Management, 2010, vol. 3, pp. 440-448.

Sherbrooke, Craig C., Optimal Inventory Modeling of Systems: Multi-Echelon Techniques, Second Edition, Chapter 2 Single-Site Inventory Model for Repairable Items, Sections 2.6 Stock Level and 2.7 Item Performance Measures, 2004, pp. 24-28.

Office Action dated Sep. 18, 2017, issued in related U.S. Appl. No. 13/335,268.

* cited by examiner

INVENTORY CONTROL FOR NON-REPAIRABLE ITEMS BASED ON PROGNOSTICS AND HEALTH MONITORING DATA

CROSS-REFERENCE TO RELATED APPLICATIONS

None.

STATEMENT REGARDING FEDERALLY SPONSORED RESEARCH OR DEVELOPMENT

None.

FIELD

The technology herein relates to data processing systems that automatically determine when aircraft components should be replaced to avoid failures.

BACKGROUND

Failure events occur during fleet operation and spare parts must be available to keep aircraft flying. To deal with these failure events and prevent Aircraft on Ground (AOG) events from happening, aircraft operators have to maintain a spare parts inventory. An inventory control program is implemented in order to fulfill the highest possible number of spare parts demand at the least possible cost.

There is a set of classical inventory control models described in literature that can be used to establish an inventory control policy. Most of these models define an inventory policy based on total cost minimization. Inventory total cost is commonly broken down into or including the following factors:

Ordering Cost: The ordering cost is composed by two components: the acquisition cost and the setup cost. The acquisition cost is the price of the acquired spare parts, and it is proportional to the lot size. The setup cost is a constant cost that represents the administrative cost of placing and processing a new order.

Holding Cost: The holding cost (also known as storage cost) is the cost of keeping a spare part in the inventory from the moment it is bought to the moment it is actually used. In some models, the holding cost is expressed as a fraction of the spare part price per year. Holding cost comprises all cost related to spare part storage such as capital cost, warehouse rental cost, insurance cost, etc.

Stockout Cost: The stockout cost is the cost related to system unavailability for not having a spare part on hand to immediately replace a failed component. It is usually proportional to the time the system stays out of operation waiting for the spare part. Intangible costs such as company reputation and costumer satisfaction can be included in the stockout cost, when good estimations for these costs can be made.

The [R, Q] model is an easy-to-implement, typical model for inventory control. See e.g., Kennedy et al, "An Overview of Recent Literature On Spare Parts Inventories", Int'l Journal of Production Economics, 76:201-15 (2002); Sun et al, "Multi-echelon Inventory Optimal Model of Civil Aircraft Spare Parts," Chinese Control and Decision Conference, 824-28 (2010), both incorporated by reference. In this model, the inventory is continuously monitored and whenever the effective stock level drops to R units, an order for Q more units is placed to replenish the inventory. The effective stock is the sum of spare parts in the warehouse and replenishments ordered but not yet received.

The performance of the [R, Q] model depends on the quality of future demands forecast. When the accuracy of future demands estimations increases, the safety inventory level needed to fulfill demands and meet service level requirements decreases and the performance of the inventory management is positively affected. In most applications, the historical demand distribution is used to forecast future demands. However, past demands may not provide a good information for future demands forecast, especially when demand behavior can vary over time.

One of the disadvantages of the classical [R, Q] model is that both the reorder point R and the lot size Q are fixed. In most applications, the use of the [R, Q] model leads to good average demands estimations. However, this model does not estimate demand fluctuations around the average.

BRIEF DESCRIPTION OF THE DRAWINGS

The following detailed description of exemplary non-limiting illustrative embodiments is to be read in conjunction with the drawings of which.

DETAILED DESCRIPTION

The example non-limiting technology herein presents a new version of the [R, Q] model to be applicable to non-repairable items, and an associated data processing system for providing such model and performing associated analysis.

Figure 4:
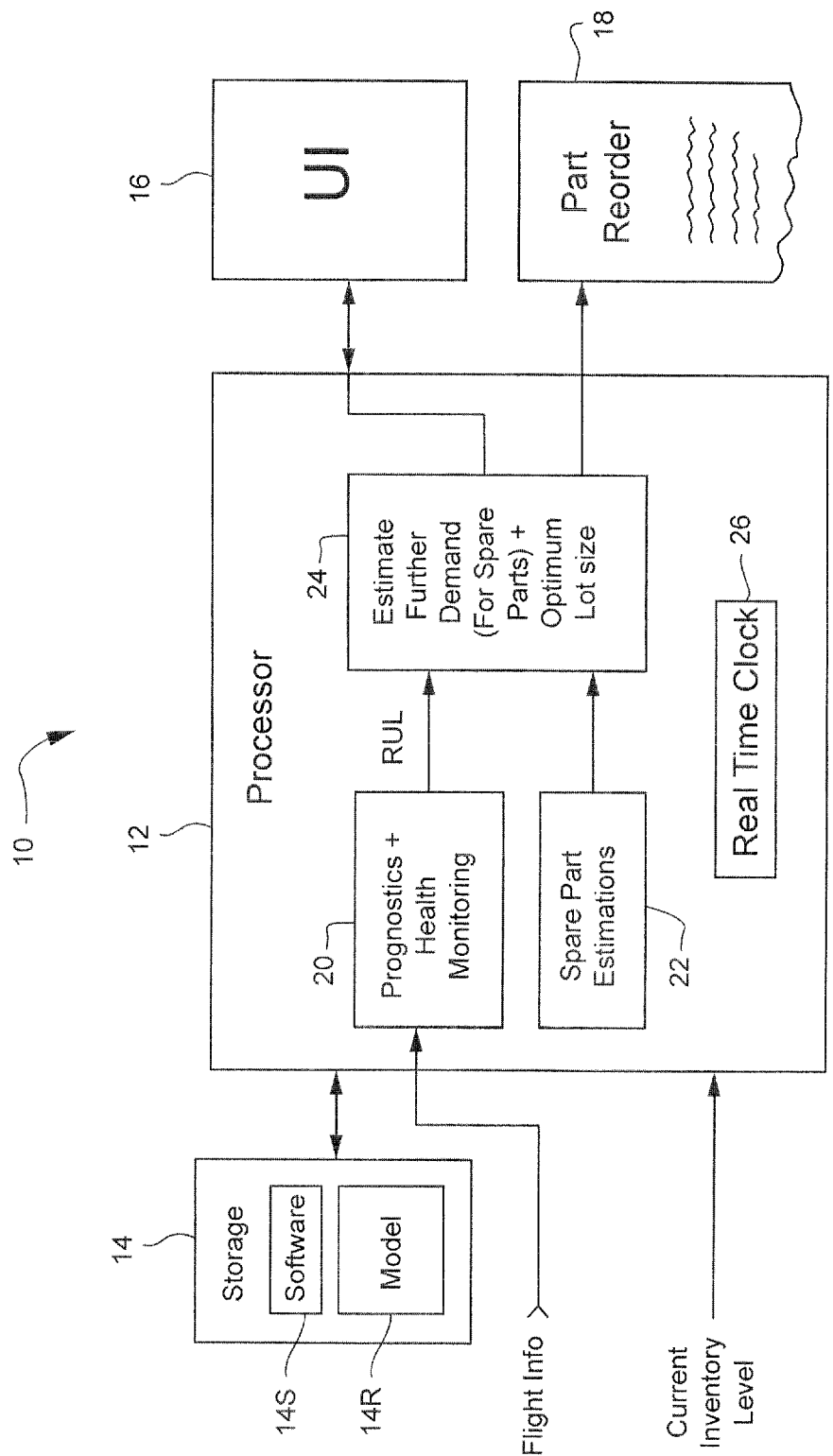
FIG. 4 shows an example non-limiting data processing system.

FIG. 4 shows an example data processing system 10 including a processor 12 coupled to non-transitory storage 14 and a user interface (UI) 16. Storage 14 stores program instructions that when executed by the processor 12 provide prognostics and health monitoring 20, spare part estimations 22, and estimation of future demand for spare parts along with selecting optimum lot size 24. To enable such functionality by processor 12, storage 14 also stores an inventory model 14R to be discussed below. This model can be implemented in code, data structures, or a combination thereof. An output of processor 12 can be a part reorder 18 specifying a particular part and a selected lot size. Processor 12 can communicate this part reorder in any desirable way including electronically, by facsimile, by email, using a B2B ecommerce engine, etc.

In the proposed model 14R, the Remaining Useful Life (RUL) estimations of components obtained from a Prognostics and Health Monitoring (PHM) system are used to estimate future demands for spare parts, allowing the reorder point R to vary during the considered time horizon. Also, for every order placed in the proposed model, the Wagner-Whitin algorithm is used to define the optimum lot size Q for that specific order.

PHM can be defined as the ability of assessing the health state, predicting impending failures and forecasting the expected RUL of a component or system based on a set of measurements collected from the aircraft systems. It comprises a set of techniques which use analysis of measurements to assess the health condition and predict impending failures of monitored equipment or system. See e.g., Vachtevanos et al, Intelligent Fault Diagnosis and Prognosis for Engineering Systems, 1st Ed (Wiley 2006), incorporated herein by reference.

At least one health monitoring algorithm can be developed for each monitored system. Each algorithm processes the relevant data and generates a degradation index that indicates how degraded the monitored system is. A degradation index can be generated for each flight leg or for a defined period of time (a day, a week, etc.).

Figure 1:
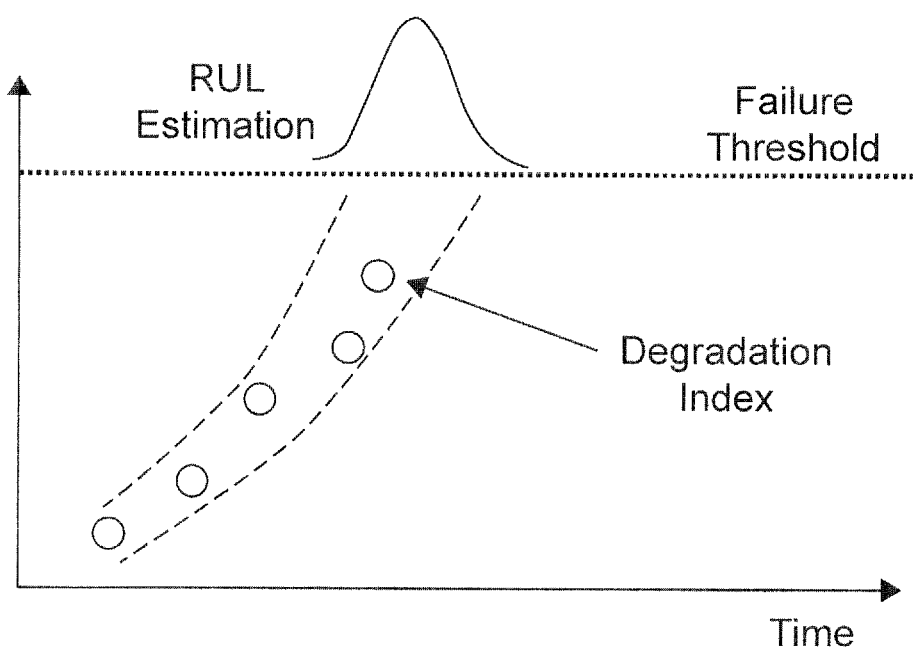
FIG. 1 shows the example evolution of the degradation index of a component monitored by a PHM system, the failure threshold and the estimated Remaining Useful Life probability distribution.

In many cases, it is possible to establish a threshold that defines system failure. When the failure threshold is known, it is possible to extrapolate the curve generated by the evolution of the degradation index over time and estimate a time interval in which the failure is likely to occur. This estimation is usually represented as a probability density function, as illustrated in FIG. 1.

In the example non-limiting embodiments, future demands are estimated based on the RUL of the components instead of (or in addition to) being estimated using historical reliability data. This change in the future demands estimation leads to a set of advantages for the performance of the inventory policy. Some non-limiting advantages are listed below.

Future demands are estimated based on the prediction of the expected dates for the next failures to occur;
The optimum inventory level varies over time;
The proposed method can identify demand fluctuations around the average demand;
The optimum lot size (number of spare parts to be acquired) is determined for each order, based on the RUL estimations.

Figure 2:
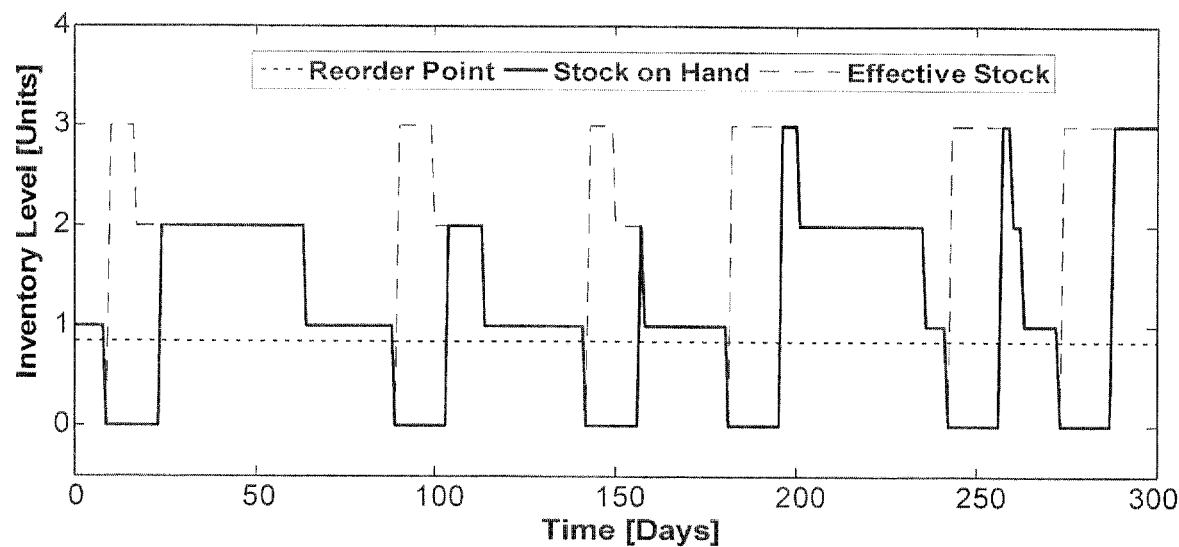
FIG. 2 shows the example evolution of the inventory level when the classical [R, Q] model is used.
Figure 3:
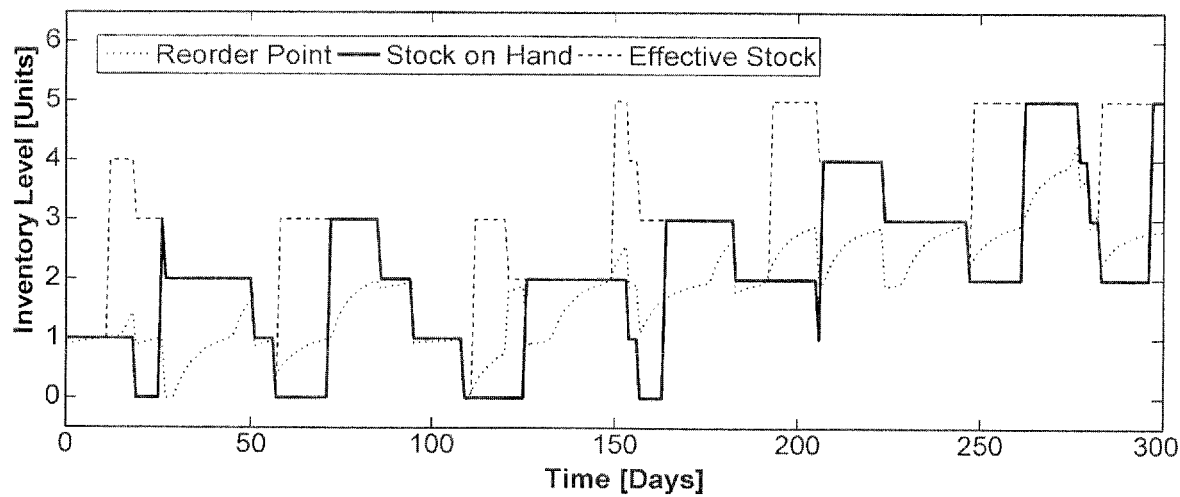
FIG. 3 shows the evolution of the inventory level when the proposed model is used.

Differences between the classical [R, Q] model and the proposed non-limiting model are illustrated in FIG. 2 and FIG. 3.

The evolution of the inventory level when the classical [R, Q] model is used is shown in conventional prior art FIG. 2. When the effective stock is lower than the reorder point R, a new order of Q units is placed. The ordered units are immediately added to the effective stock. The ordered units are received after the lead time. Parameters R and Q are fixed. The effective inventory level is always compared with a fixed reorder point. When a new order is placed, the effective inventory level is immediately updated, while the stock on hand is updated only after a lead time. The lead time is the time delay between the instant an order is placed and the instant it is received.

Figure 5:
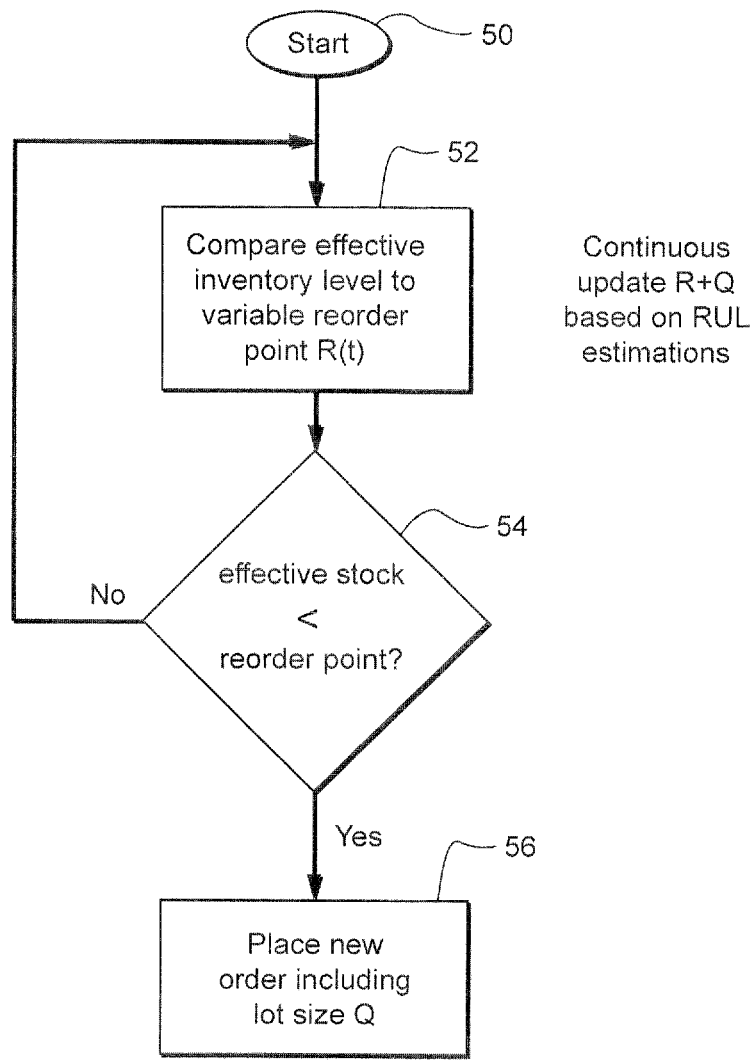
FIG. 5 shows example non-limiting program control steps embodied in software stored in a non-transitory memory device for execution by the data processing system.

The example evolution of the inventory level when the proposed model is used is shown in FIG. 3. In this non-limiting example, the effective inventory level is compared with a variable reorder point, R(t) (FIG. 5 block 52). When the effective stock is lower than the reorder point R, a new order of Q units is placed (blocks 54, 56). Also, the lot size is optimized for each order, the processor 12 using the Wagner-Whitin algorithm to define the optimum lot size Q for that specific order. Parameters R and Q are continuously updated based on the RUL estimations obtained from a PHM system (blocks 52, 56). The ordered units are immediately added to the effective stock. The ordered units are received after the lead time. This process improves the performance of the inventory control policy.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An inventory control process comprising:
collecting a set of health measurements across aircraft systems of multiple aircraft;
using a processor, continually performing prognostics and health monitoring of at least one aircraft component across the multiple aircraft based on the collected set of health measurements from the aircraft systems, including calculating a degradation index for said at least one aircraft component for each flight leg of each of the multiple aircraft;
based on a series of generated degradation indices calculated over time, using the processor to predict when failures of the at least one component are likely to occur;
based on said predicted failures, using the processor to estimate future demand for spares of said at least one component for the multiple aircraft;
using the processor to generate a variable reorder point R(t) for the spares based on the estimated future demand;
using the processor, comparing effective inventory level of said component with the variable reorder point, R(t);
with the processor, when the effective stock is lower than the variable reorder point R(t), using the Wagner-Whitin algorithm to define an optimal lot size Q, placing a new order of Q units for said at least one component and adding said new order of Q units to the current effective inventory level corresponding to said component; and
the processor using a real time clock to continually update parameters R and Q based on the estimated future demands based on the prognostics and health monitoring generating the set of health measurements collected from the aircraft systems across the multiple aircraft and the calculated degradation indices for each flight leg of each aircraft.

2. The process of claim 1 wherein the processor obtains Remaining Useful Life (RUL) estimations of components from a Prognostics and Health Monitoring (PHM) system based on the calculated degradation index, and uses the RUL estimations to estimate future demands for spare parts, and varying the reorder point R during the considered time horizon.

3. An inventory control system comprising:
a processor including a real time clock; and
a non-transitory storage device coupled to the processor, the non-transitory storage device storing program instructions that when executed by the processor cause the processor to:
(a) collect a set of health measurements from across aircraft systems of multiple aircraft;
(b) based at least in part on the collected set of health measurements, continually perform prognostics and health monitoring across the multiple aircraft of at least one aircraft component, including calculating a degradation index for each flight leg of each of the multiple aircraft;
(c) based on a series of generated degradation indices calculated over time, developing evolutions of the degradation indices over time and extrapolating the developed evolutions to predict the times when failures of the at least one component are likely to occur;

(d) based on said predicted failure times, estimating future demand for spares of said at least one component for the multiple aircraft;

(e) generating a variable reorder point R(t) for the spares based on the estimated future demand;

(f) compare effective inventory level of said at least one component with the variable reorder point, R(t);

(g) when the effective stock is lower than the reorder point R(t), using the Wagner-Whitin algorithm to define an optimal lot size Q, placing a new order of Q units for said at least one component and adding said new order of Q units to the current effective inventory level of said component; and (h) using the processor including the real time clock, continually updating parameters R and Q based on the remaining useful life estimations obtained from the prognostics and health monitoring based on the set of health measurements collected from the aircraft systems across the multiple aircraft and the calculated degradation indices for each flight leg of each aircraft.

4. The system of claim 3 wherein the processor is further configured to immediately add the ordered units to the effective stock.

5. The system of claim 3 wherein the processor is configured to obtain Remaining Useful Life (RUL) estimations of components from the Prognostics and Health Monitoring (PHM) and to use the RUL to estimate future demands for spare parts, allowing the reorder point R to vary during the considered time horizon.

6. A system for managing repair parts for an aircraft, the system comprising at least one processor operatively coupled to memory, the at least one processor including a real time clock, the processor being configured to perform functions comprising:

establishing thresholds that define failure of each of plural monitored aircraft systems;

using health monitoring algorithms to monitor health of the plural aircraft systems over time;

based on the monitored health, generating degradation indices that indicate degree of degradation of not-yet-failed plural aircraft systems;

recording the generated degradation indices over time;

based on the recorded degradation indices over time, developing evolutions of the degradation indices over time;

extrapolating the developed evolutions of the degradation indices over time;

predicting remaining useful life time intervals when failure of each of the plural aircraft systems is likely to occur in response to the extrapolations and said established thresholds;

based on said predicted remaining useful life time intervals, estimating future demands for spare parts for the plural aircraft systems;

generating variable reorder time points R(t) for the spare parts based on the estimated future demands;

comparing effective inventory levels of the spare parts with the variable reorder points R(t); and automatically generating orders for the spare parts based on results of the comparisons.

7. The method of claim 6, further including configuring the processor, using monitored health data, to predict impending failures across multiple aircraft, and forecasting the expected Remaining Useful Life of each instance of a component on each of the multiple aircraft.

8. The method of claim 6, further including recalculating the variable reorder point R(t) after a determined reorder of lot size Q is added to an effective inventory level.

9. The method of claim 6 wherein estimating future demands for spare parts for the plural aircraft systems comprises using a probability density function.

10. The method of claim 6 further including varying optimum inventory level over time.

11. The method of claim 6 further including identifying demand fluctuations around average demand.

12. The method of claim 6 further including determining optimum number of spare parts to be acquired based on the estimated future demand.

13. The method of claim 6 further including:

when the effective stock is lower than the reorder point R, automatically placing a new order of Q units while optimizing the lot size using the Wagner-Whitin algorithm to define an optimum lot size Q; and continually updating parameters R and Q based on the estimations obtained from the health monitoring algorithms.

* * * * *